US012643392B2

(12) United States Patent
Yoon et al.

(10) Patent No.: US 12,643,392 B2
(45) Date of Patent: Jun. 2, 2026

(54) VARIABLE GRILLE APPARATUS

(71) Applicants:HYUNDAI MOTOR COMPANY,
Seoul (KR); KIA CORPORATION,
Seoul (KR); **HYUNDAI MOBIS CO.,
LTD.**, Seoul (KR)

(72) Inventors: Jin Young Yoon, Gimpo-si (KR); **Dong
Eun Cha, Hwaseong-si (KR); Hong
Heui Lee, Suwon-si (KR); Jae Sup
Byun, Seongnam-si (KR); Jang Ho
Kim**, Seoul (KR)

(73) Assignees: HYUNDAI MOTOR COMPANY,
Seoul (KR); KIA CORPORATION,
Seoul (KR); **HYUNDAI MOBIS CO.,
LTD.**, Seoul (KR)

( * ) Notice: Subject to any disclaimer, the term of this
patent is extended or adjusted under 35
U.S.C. 154(b) by 367 days.

(21) Appl. No.: 18/220,084

(22) Filed: Jul. 10, 2023

(65) Prior Publication Data

US 2024/0174076 A1 May 30, 2024

(30) Foreign Application Priority Data

Nov. 30, 2022 (KR) ........................ 10-2022-0164823

(51) Int. Cl.
B60K 11/08 (2006.01)
(52) U.S. Cl.
CPC ............. B60K 11/085 (2013.01); B60K 11/08
(2013.01)

(58) Field of Classification Search
CPC .............................. B60K 11/085; B60K 11/08
USPC ......................................................... 180/68.1
See application file for complete search history.

(56) References Cited

U.S. PATENT DOCUMENTS

| | | | | |
|---|---|---|---|---|
| 8,967,308 B2 * | 3/2015 | Saito | .................... | B60K 11/085 |
| | | | | 180/68.1 |
| 9,447,719 B2 * | 9/2016 | Kiener | .................... | F28F 27/02 |
| 9,533,565 B2 * | 1/2017 | Elliott | .................. | B60K 11/085 |
| 10,040,344 B2 * | 8/2018 | Schöning | ................ | B60R 19/48 |
| 10,202,049 B2 * | 2/2019 | Nagaosa | ................. | B60L 58/33 |
| 10,479,296 B2 * | 11/2019 | Glickman | .............. | B62D 65/16 |
| 11,479,110 B2 * | 10/2022 | Guyon | .................. | B62D 65/16 |

FOREIGN PATENT DOCUMENTS

KR          19990024905 U     7/1999

* cited by examiner

*Primary Examiner* — Hau V Phan
(74) *Attorney, Agent, or Firm* — Lempia Summerfield
Katz LLC

(57) ABSTRACT

A variable grille apparatus adjusts the flow rate of air
flowing through a grille. Commercial value of a vehicle is
improved by enhanced opening and closing motions when
adjusting the flow rate of air. Further, since the grille is
opened and closed in various ways such as by sequential or
simultaneous opening and closing, the opening and closing
motions of the grille are enhanced, the external design is
diversified, and a flow rate of air is secured through struc-
turally optimal arrangement.

16 Claims, 11 Drawing Sheets

VARIABLE GRILLE APPARATUS

CROSS REFERENCE TO RELATED APPLICATION

The present application claims priority to Korean Patent Application No. 10-2022-0164823 filed Nov. 30, 2022, the entire contents of which are incorporated herein for all purposes by this reference.

BACKGROUND

Field of the Disclosure

The present disclosure relates to a variable type grille apparatus that adjusts the flow rate of air flowing through a grille and has improved commercial value by enhancing opening and closing motions when adjusting the flow rate of air.

Description of the Related Art

In general, it is required to cool the parts or components of a drivetrain and the parts or components of a cooling system in vehicles. Accordingly, a grille through which air can flow is disposed on the front of vehicles to cool the parts of a drivetrain and the parts of a cooling system.

In other words, an induced wind flows inside an engine compartment through a grille when a vehicle (i.e., mobility) is driven and passes by or over the parts of a drivetrain and the parts of a cooling system. The parts can thereby be cooled through heat exchange with the air, i.e., through convection.

The parts of a drivetrain and the parts of a cooling system of a vehicle can be operated with optimal performance only when they reach temperatures within a predetermined range. However, since the grilles of vehicles are always open, the parts of a drivetrain and the parts of a cooling system always exchange heat with external air (i.e., outside air). In other words, inflow of air may adversely affect aerodynamic performance and fuel efficiency until the temperatures of the parts of a drivetrain increase to a predetermined range in the early stage after start-up. Further, when a vehicle is driven at a high speed, the flow rate of air by an induced wind is excessively increased, which may decrease fuel efficiency due to an increase in air resistance.

In order to solve the problems described above, recent vehicles are equipped with an active air flap. Such an active air flap is installed on a grille and configured to be able to open and close. The air flap blocks air when it is closed, and the air flap passes air through the grille when it is opened.

However, existing active air flaps are configured such that a plurality of doors is rotated by a complicated link structure. Accordingly, such active air flaps have a complicated structure and are heavy. Thus, a larger motor is needed for operating the plurality of doors and the link structure.

Further, such existing active air flaps simply serve only to selectively allow and prevent flow of air.

The description provided above as a related art of the present disclosure is just to help in understanding the background of the present disclosure. The description should not be construed as being included in the related art known by those having ordinary skill in the art.

SUMMARY

The present disclosure has been made in an effort to solve the problems described above. An objective of the present disclosure is to provide a variable grille apparatus that adjusts the flow rate of air flowing through the grille. Another objective of the present disclosure is to provide a variable grille apparatus that has improved commercial value by enhancing opening and closing motions when adjusting the flow rate of air.

In order to achieve the above objectives, a variable grille apparatus according to the present disclosure includes a housing having an open space that is open in a front-rear direction. The apparatus also has a flap unit rotatably installed on the housing and configured to open and close the open space depending on a rotation position. The apparatus further includes a driving unit having a driving motor and a rotor configured to be rotated by rotational power of the driving motor. The rotor is in contact with the flap unit in which a plurality of actuating portions is formed on an edge of the rotor with which the flap unit is in contact. The actuating portions are formed in different shapes such that the flap unit is rotated in different ways when the rotor is rotated. Additionally, the apparatus includes an elastic member that is connected to the flap unit to return the flap unit to an initial position.

The flap unit may include a rotary shaft rotatably installed on the housing and a panel coupled to the rotary shaft to rotate with the rotary shaft.

The rotary shaft and the rotor may be disposed in a zigzag pattern in the front-rear direction. The rotary shaft may be rotated in the front-rear direction and the rotor may be rotated in an up-down direction. Furthermore, the rotary shaft and the rotor may be connected through a connection link.

The rotary shaft and the rotor may be connected through a connection link. A coupling portion may protrude from the rotary shaft and a through-hole that extends a predetermined distance may be formed at the coupling portion. A first end of the connection link may be in contact with the rotor and a second end of the connection link may be inserted in the through-hole. Accordingly, the connection link may linearly move in accordance with a rotation position of the rotor, thereby rotating the rotary shaft together with the coupling portion.

A pair of stoppers spaced apart from each other may be formed at the second end of the connection link. The coupling portion may be positioned between the stoppers.

An elastic supporting portion may be formed at the rotary shaft and the elastic member may be connected to the elastic supporting portion in contact with the housing. Thus, the elastic member may provide elasticity so that the rotary shaft can be returned to an initial position.

A plurality of flap units may be provided in the open space of the housing. Panels of the plurality of flap units may be formed in diamond shapes and arranged in a longitudinal direction of the rotary shaft.

A plurality of flap units may be provided in the open space of the housing. The driving unit may include a driving shaft configured to be rotated by power from the driving motor and a plurality of rotors. The plurality of rotors is in contact with a plurality of flap units, respectively, and may be disposed on the driving shaft.

A seat in which the driving shaft is seated may be formed at the housing. An open hole may be formed at the seat so that the rotor can be inserted and rotated therein.

The rotors of each driving unit may be disposed such that the actuating portions are sequentially arranged in a zigzag manner in a longitudinal direction of the driving shaft.

The rotor may have a plurality of actuating portions spaced apart from each other and formed on a base rotating about a rotation center. The actuating portions may be formed to be maintained in a diameter range preset from the rotation center.

The rotor may have a first actuating portion, a second actuating portion, and a third actuating portion that are spaced apart from each other on an edge of a base of the rotor. The actuating portions may be formed differently in accordance with an opening and closing function of the flap unit.

The first actuating portion may have a first contact surface extending in the direction of a normal of the base and a second contact surface extending across a rotation center, thereby having a steep variation section.

The second actuating portion may have a first contact section and a second contact section symmetrically formed with respect to a reference line crossing the rotation center of the base. Ends of the first contact section and the second contact section may form a chamfered surface so that the second actuating portion may have a gentle variation section.

The third actuating portion may have a third contact section and a fourth contact section symmetrically formed with respect to a reference line crossing the rotation center of the base. Ends of the third contact section and the fourth contact section may meet each other to form a pointed end so that the third actuating portion may have a steep variation section.

The driving unit may be positioned at an uppermost end or a lowermost end of the flap unit.

The variable type grille apparatus having the structure described above adjusts the flow rate of air passing through the grille. The opening and closing motions for adjusting the flow rate of air is enhanced, thereby improving the commercial value of a vehicle equipped with the disclosed grille apparatus.

Further, since the grille is opened and closed in various ways such as by sequential or simultaneous opening and closing, the opening and closing motions of the grille are enhanced, the external design is diversified, and a flow rate of air is secured through a structurally optimal arrangement.

BRIEF DESCRIPTION OF THE DRAWINGS

The accompanying drawings of this specification exemplify embodiments and help to understand the present disclosure together with the following detailed description. The present disclosure should not be construed as being limited to the drawings.

DETAILED DESCRIPTION

Figure 1:
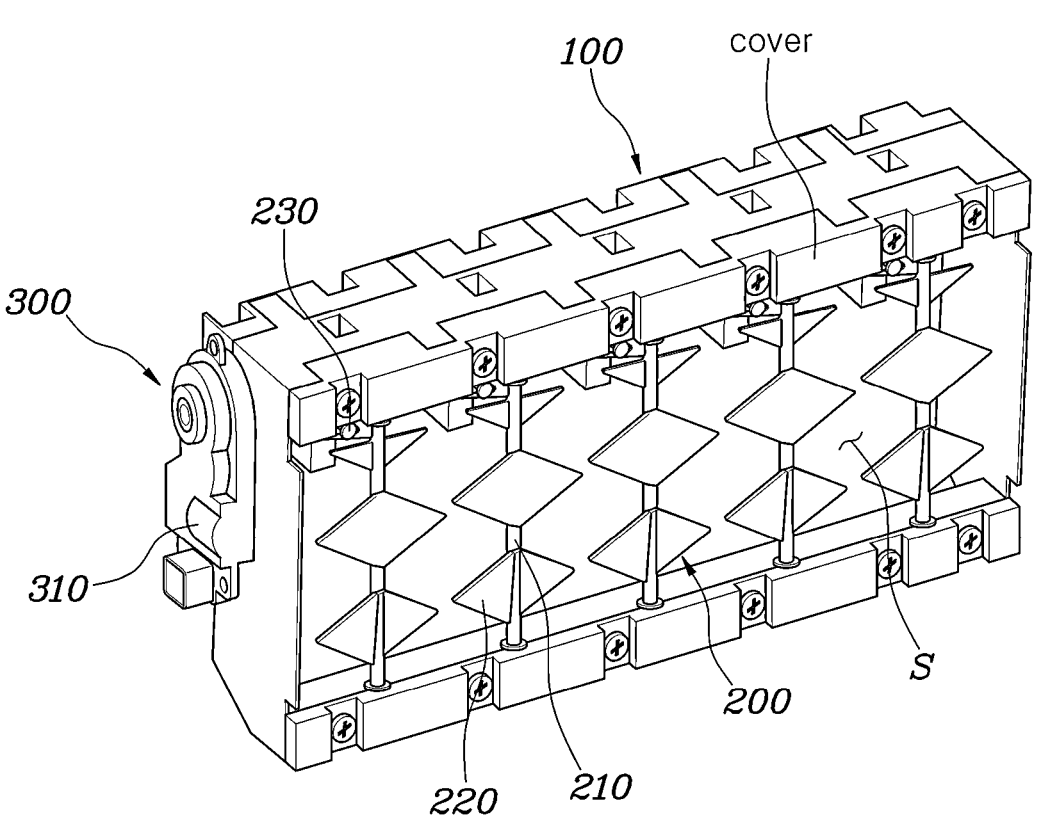
FIG. 1 is a view showing a variable grille apparatus according to an embodiment of the present disclosure.

Hereafter, embodiments of the present disclosure are described in detail with reference to the accompanying drawings. The same or similar components are given the same reference numerals regardless of which drawings illustrate the components and redundant descriptions thereof have been omitted.

Terms "module" and "unit" that are used for components in the following description are used only for the convenience of description without having discriminate meanings or functions.

In the following description, where it has been determined that the detailed description of known technologies related to the present disclosure would have made the subject matter of the embodiments described herein unclear, the detailed description has been omitted. Further, the accompanying drawings are provided only to help understand the embodiments disclosed in the specification. Thus, the technical spirit disclosed in the specification is not limited by the accompanying drawings. All variations, changes, equivalents, and replacements should be understood as being included in the spirit and scope of the present inventive concept.

Terms including ordinal numbers such as "first," "second," and the like may be used to describe various components, but the components are not to be construed as being limited by the terms. The terms are used only to distinguish one component from another component.

It should be understood that when one element is referred to as being "connected to" or "coupled to" another element, it may be connected directly to or coupled directly to another element or it may be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It should be further understood that the terms "comprises" or "has" and variations thereof, as used in this specification, specify the presence of stated features, steps, operations, components, parts, or a combination thereof. However, the terms do not preclude the presence or addition of one or more other features, numerals, steps, operations, components, parts, or a combination thereof.

In addition, a unit or a control unit included in names such as a motor control unit (MCU) and a hybrid control unit (HCU) is only a term that is generally used to name a controller that controls specific functions of a vehicle rather than meaning a generic function unit. When a component, device, element, or the like of the present disclosure is described as having a purpose or performing an operation, function, or the like, the component, device, or element should be considered herein as being "configured to" meet that purpose or to perform that operation or function.

A variable grille apparatus according to embodiments of the present disclosure is described hereafter with reference to the accompanying drawings.

Figure 2:
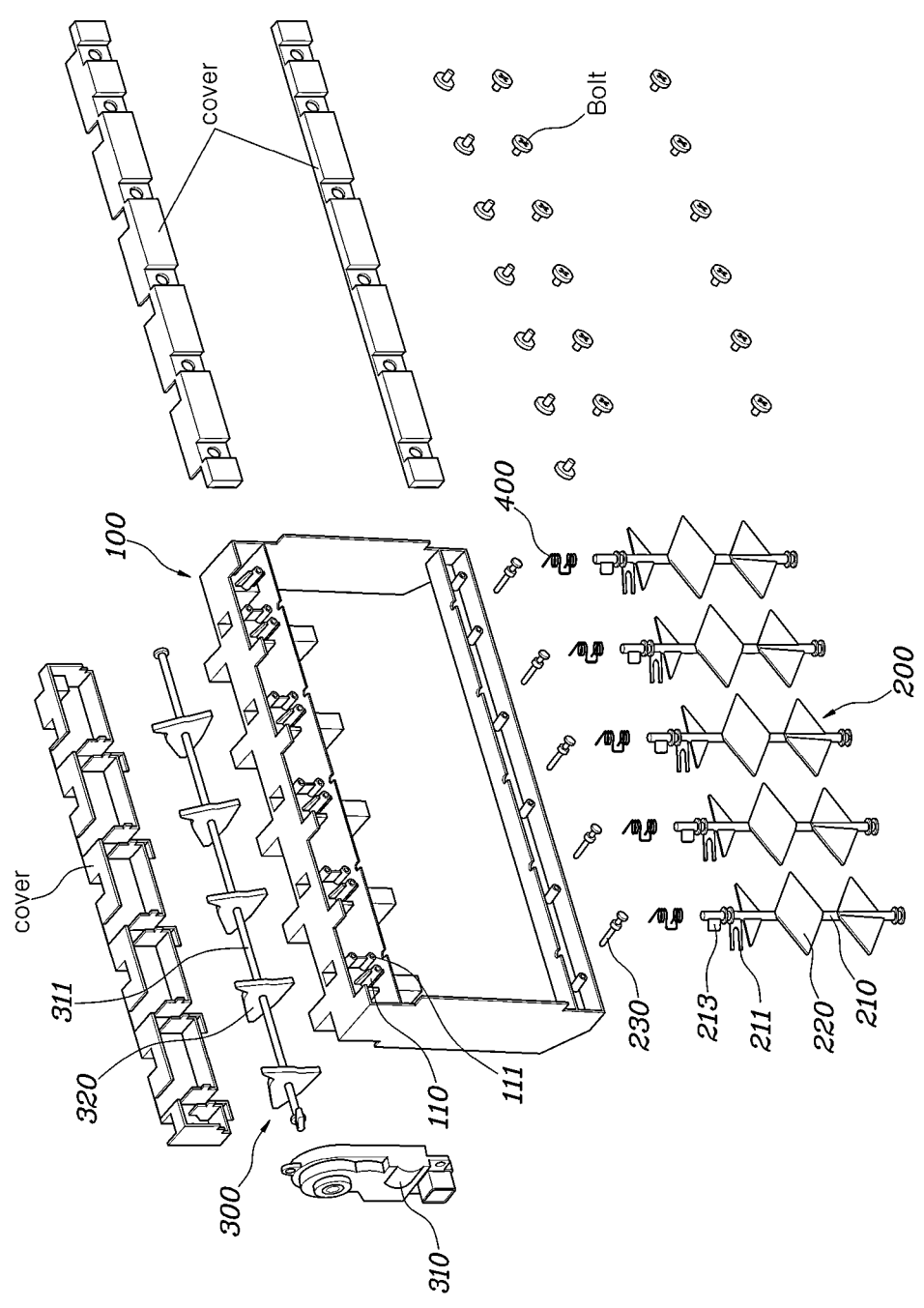
FIG. 2 is an exploded view showing the variable grille apparatus shown in FIG. 1.
Figure 3:
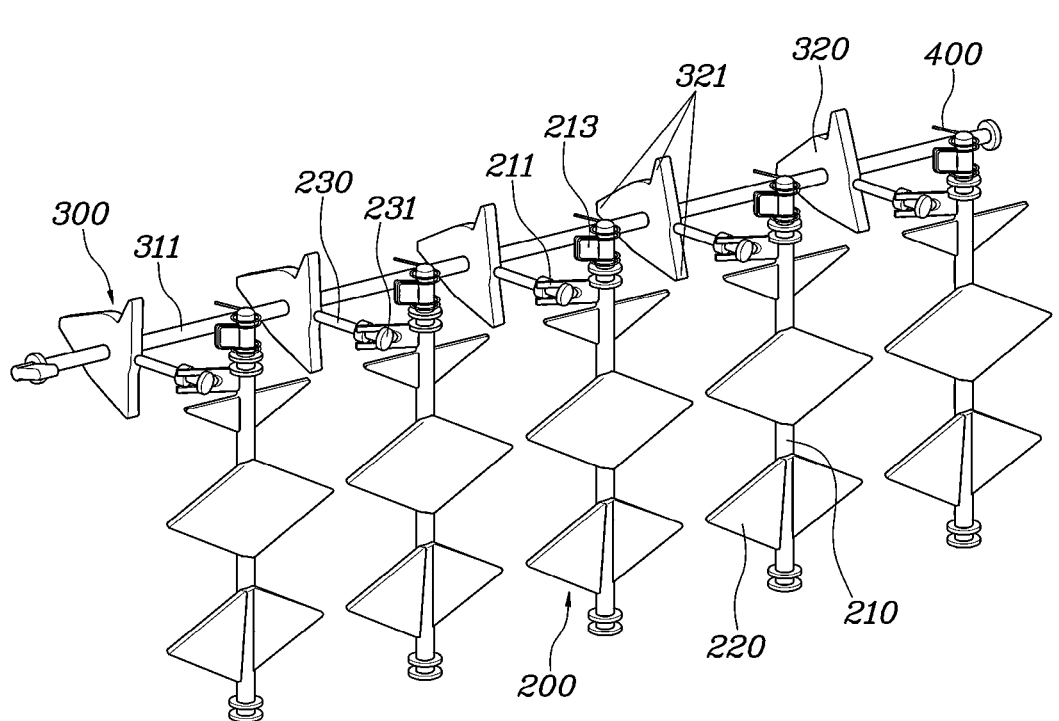
FIG. 3 is a view showing a flap unit and a driving unit of the variable grille apparatus shown in FIG. 1.
Figure 4:
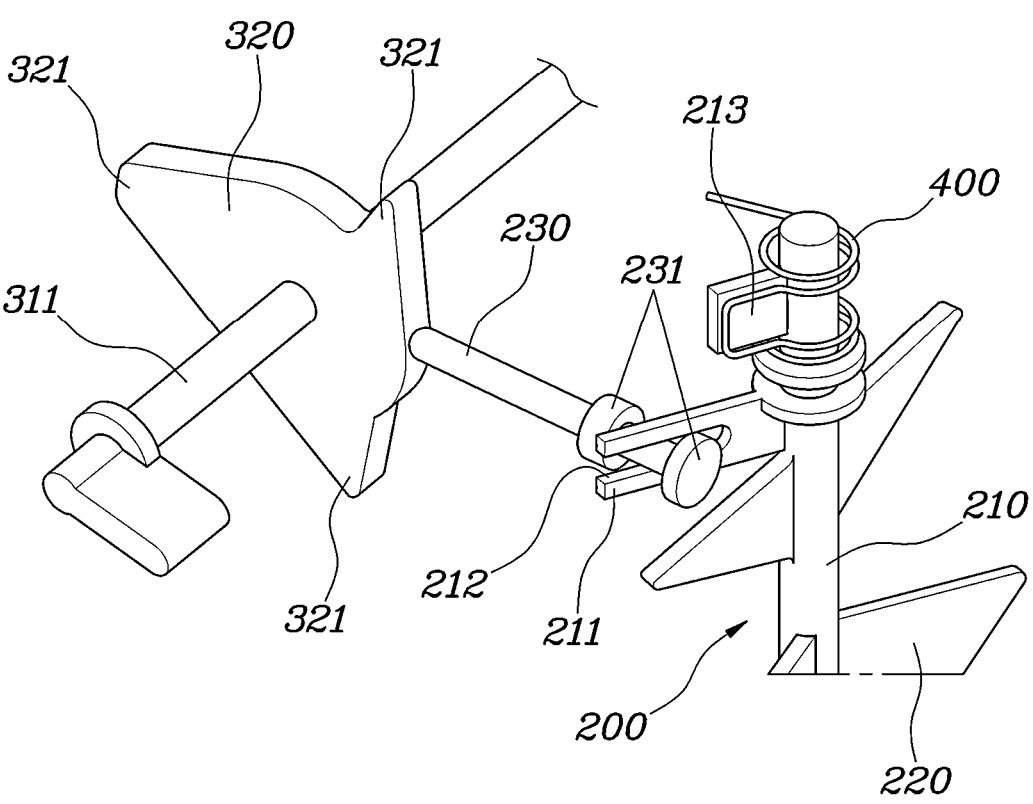
FIG. 4 is a view illustrating a connection link of the variable grille apparatus shown in FIG. 1.
Figure 5:
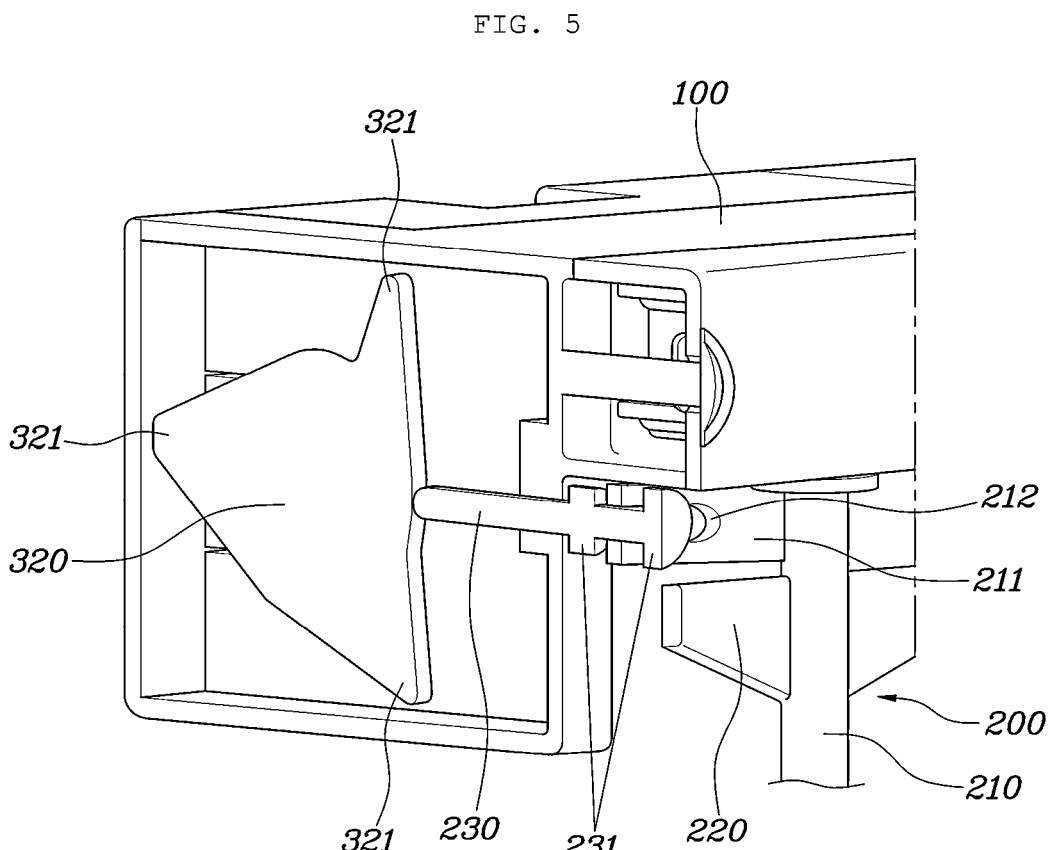
FIG. 5 is a view showing a closed state of the flap unit in the variable grille apparatus shown in FIG. 1.
Figure 6:
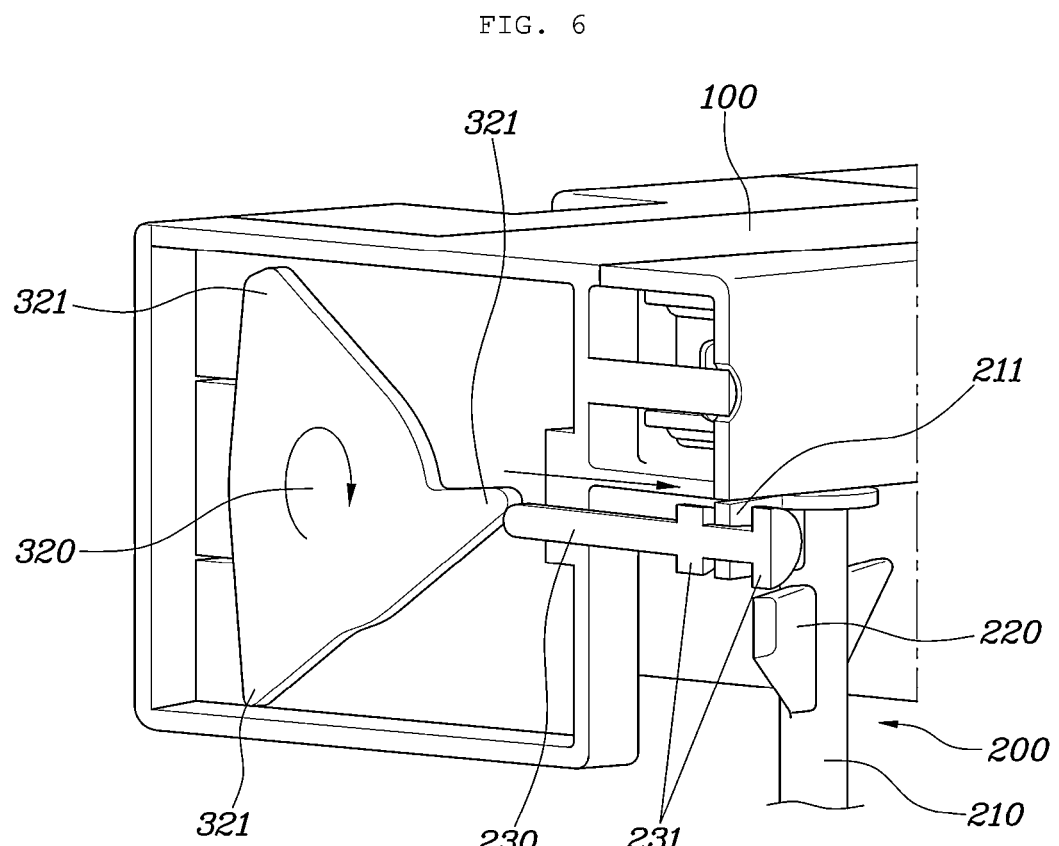
FIG. 6 is a view showing an opening operation of the flap unit in the variable grille apparatus shown in FIG. 1.
Figure 7:
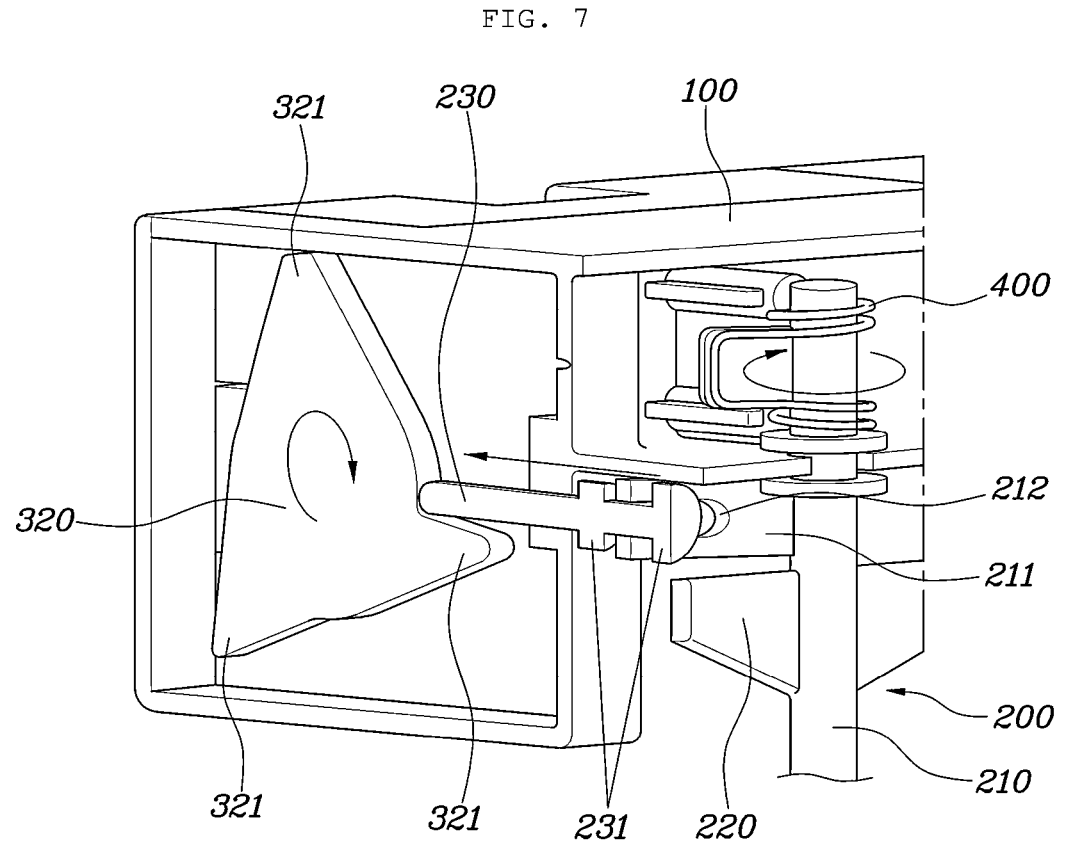
FIG. 7 is a view showing a returning operation of the flap unit in the variable grille apparatus shown in FIG. 1.
Figure 8:
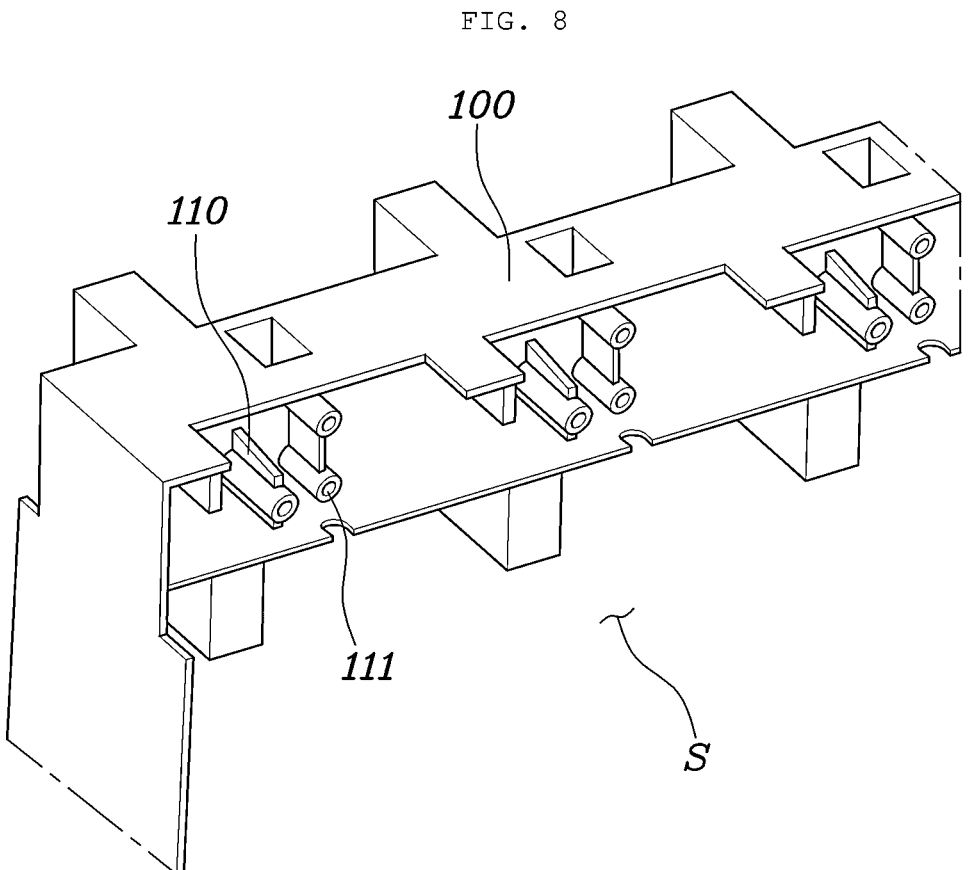
FIG. 8 is a view showing a seat of a housing in the variable grille apparatus shown in FIG. 1.
Figure 9:
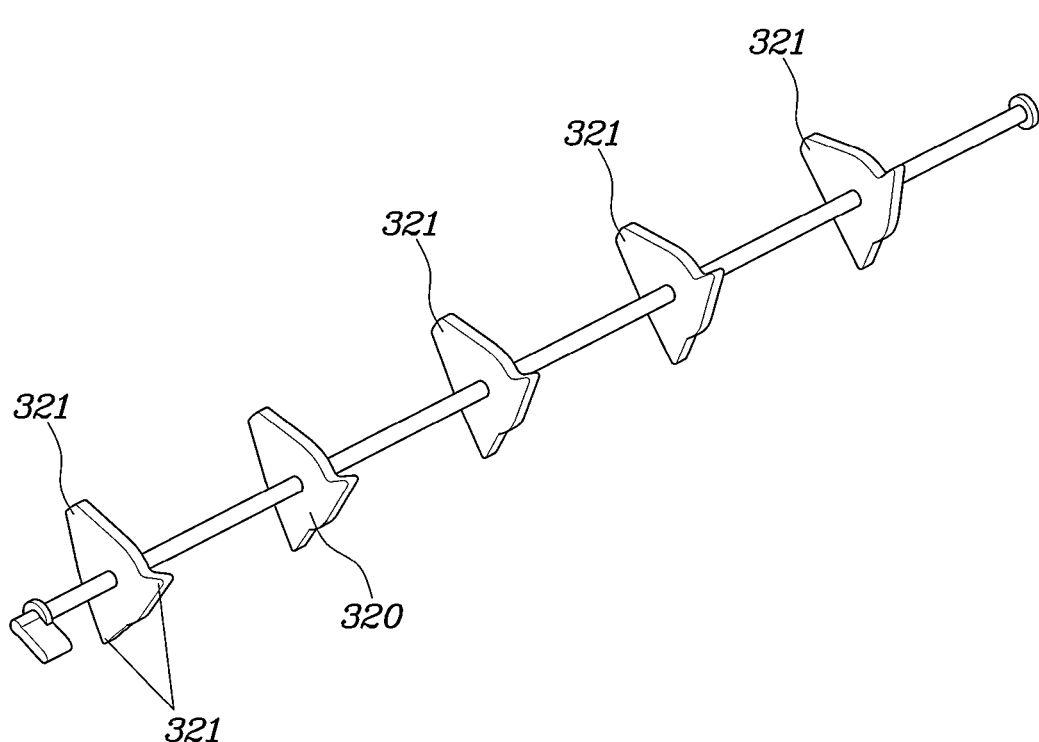
FIG. 9 is a view showing an embodiment of a driving unit according to the present disclosure.
Figure 10:
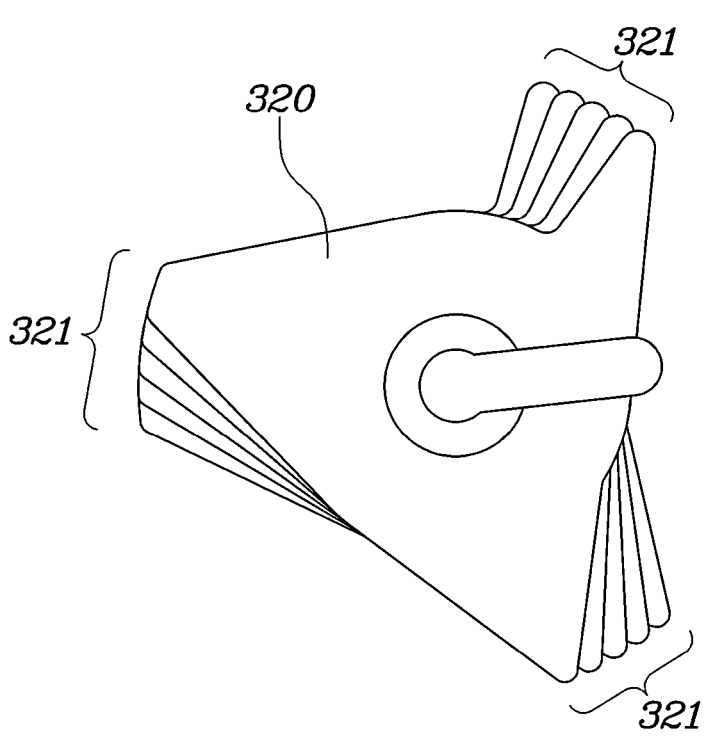
FIG. 10 is a side view illustrating an embodiment of the driving unit shown in FIG. 9.
Figure 11:
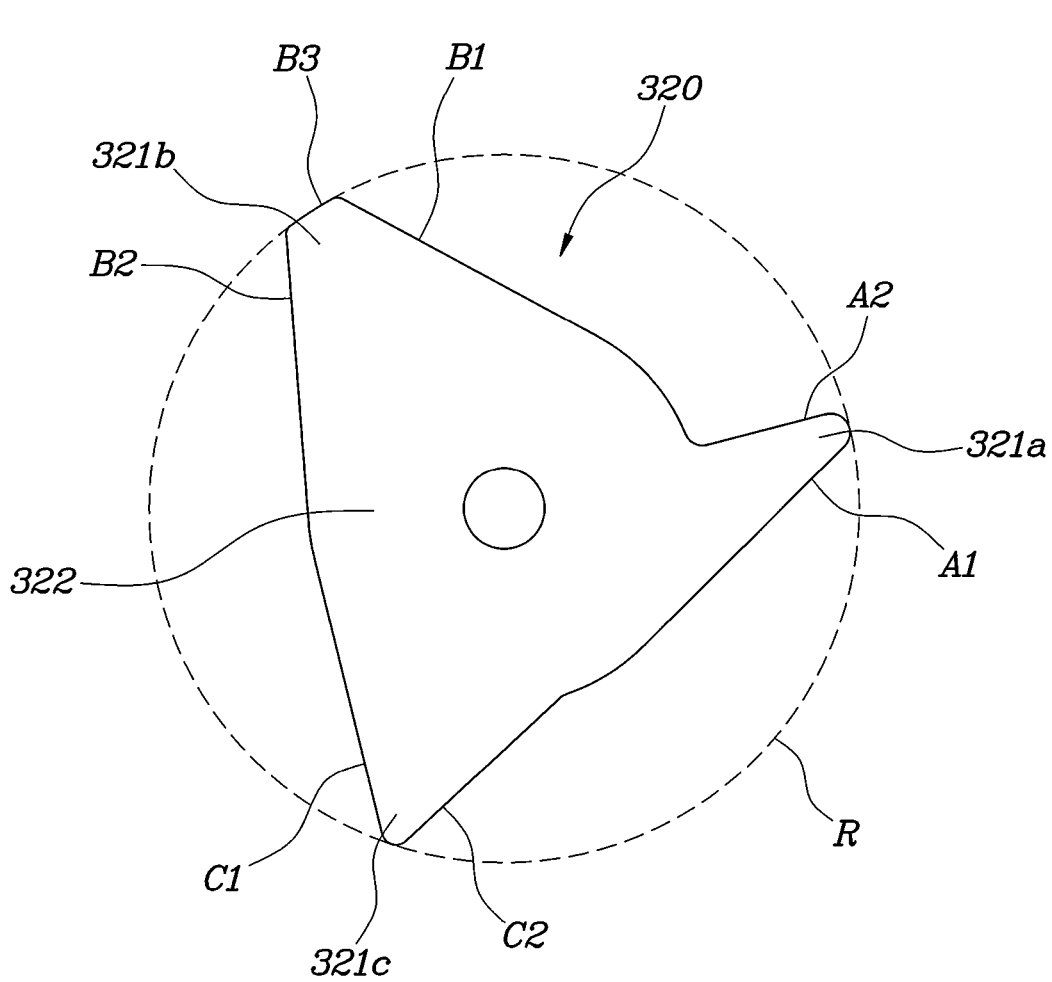
FIG. 11 is a view illustrating a rotor and actuating portions of the driving unit according to the present disclosure.

FIG. 1 is a view showing a variable grille apparatus according to an embodiment of the present disclosure. FIG. 2 is an exploded view showing the variable grille apparatus shown in FIG. 1. FIG. 3 is a view showing a flap unit and a driving unit of the variable grille apparatus shown in FIG. 1. FIG. 4 is a view illustrating a connection link of the variable grille apparatus shown in FIG. 1. FIG. 5 is a view showing the closed state of the flap unit in the variable grille apparatus shown in FIG. 1. FIG. 6 is a view showing an opening operation of the flap unit in the variable grille apparatus shown in FIG. 1. FIG. 7 is a view showing a returning operation of the flap unit in the variable grille apparatus shown in FIG. 1. FIG. 8 is a view showing a seat of a housing in the variable grille apparatus shown in FIG. 1. FIG. 9 is a view showing an embodiment of a driving unit according to the present disclosure. FIG. 10 is a side view illustrating an embodiment of the driving unit shown in FIG. 9. FIG. 11 is a view illustrating a rotor and actuating portions of the driving unit according to the present disclosure.

A variable grille apparatus according to the present disclosure is described below. The apparatus may include one or more of each of the components described below, though the components may be described in the singular for ease of description. As shown in FIGS. 1-3, the variable grille apparatus includes a housing 100 having an open space S that is open in the front-rear direction. The apparatus also includes a flap unit 200 rotatably installed on the housing 100 and configured to open or close the open space S depending on a rotation position. The apparatus also includes a driving unit 300 having a driving motor 310 and a rotor 320 configured to be rotated by rotational power of the driving motor 310. The rotor 320 is also configured to contact the flap unit 200 in which a plurality of actuating portions 321 is formed on the edge of the rotor 320 with which the flap unit 200 is in contact. The actuating portions 321 may be formed in different shapes such that the corresponding flap unit 200 is rotated in different ways when the rotor 320 is rotated. Additionally, the apparatus includes an elastic member 400 connected to the flap unit 200 to return the flap unit 200 to an initial position.

The housing 100 is installed on the front of a vehicle, i.e., may be installed on a grille. An open space S through which air flows is defined in the housing 100 so that air flows through the open space S to cool the parts of a drivetrain and the parts of an electronic system.

The flap unit 200 is rotatably installed on the housing 100. The open space S is selectively opened or closed depending on the rotation position of the flap unit 200.

The flap unit 200 is opened/closed by the driving unit 300. The driving unit 300 includes the driving motor 310 and the rotor 320. The driving motor 310 is installed on the housing 100 and the rotor 320 is connected to the driving motor 310. Accordingly, when rotational power is generated from the driving motor 310, the rotor 320 that is connected to the driving motor 310 is rotated. Furthermore, the flap unit 200, being in contact with the rotor 320, is rotated with the rotation of the rotor 320 whereby the rotation position is adjusted. The driving motor 310 may be operated in response to a control instruction that is input from a motor control unit.

In other words, the actuating portions 321 are formed on the rotor 320, i.e., the actuating portions 321 are protruding portions formed on the edge of the rotor 320. When the rotor 320 is rotated, the actuating portion 321 comes in contact with the flap unit 200. Thus, the flap unit 200 is pushed by the actuating portion 321 and rotation is performed.

In particular, a plurality of actuating portions 321 may be formed on the edge of the rotor 320 and may be formed in different shapes. Since the actuating portions 321 are formed in different shapes, the opening/closing position and the opening/closing speed, i.e., the speed at which the flap unit 200 comes in contact with the actuating portions 321, may be adjusted and configurable. For example, when the actuating portions 321 are smoothly curved, the flap unit 200 can be operated to slowly open or close when coming in contact with the actuating portions 321 due to the rotation of the rotor 320. When the actuating portions 321 are steeply curved, the flap unit 200 can be operated to quickly open or close when coming in contact with the actuating portions 321 due to the rotation of the rotor 320.

As described herein, when the flap unit 200 is in contact with the rotor 320 of the driving unit 300 and when the rotor 320 is rotated by operation of the driving motor 310, the actuating portions 321 that are formed on the edge of the rotor 320 selectively come in contact with the flap unit 200. Thus, the opening or closing positions and speeds of the flap unit 200 can be adjusted individually by the actuating portions 321.

Since the elastic member 400 is disposed on the flap unit 200, the flap unit 200 can be returned to its initial position by the elasticity and biasing force of the elastic member 400. The elasticity of the elastic member 400 causes the flap unit 200 to separate from the actuating portion 321 due to the rotation of the rotor 320. In other words, the flap unit 200 can be opened when the actuating portions 321 come in contact with the flap unit 200 due to the rotation of the rotor 320. Additionally, the flap unit 200 can be returned to the closed position by the elasticity of the elastic member 400 when the flap unit 200 is separated from the actuating portions 321.

Furthermore, the flap unit 200 may include a rotary shaft 210 rotatably installed on the housing 100. The flap unit 200 may include a panel 220 that is coupled to the rotary shaft 210 to rotate with the rotary shaft 210.

According to an embodiment of the present disclosure, the rotary shaft 210 is rotatably installed at the upper end or the lower end of the housing 100. The panel 220 is coupled to the rotary shaft 210 and rotates with the rotary shaft 210. A bearing structure may be applied to both ends of the rotary shaft 210 so that the rotary shaft 210 can be smoothly rotated on the housing 100.

The flap unit 200 may have a plurality of rotary shafts 210 and the rotary shafts 210 may be spaced apart from each other in the open space S of the housing 100. Accordingly, when the rotary shafts 210 of the flap unit 200 are rotated simultaneously or at different timings, the opening and closing motions of the panels 220 that are coupled to the rotary shafts 210, respectively, can be diversified.

As shown in FIGS. 3 and 4, the rotary shaft 210 and the rotor 320 are spaced apart in the forward-rearward direction. The rotary shaft 210 is rotated in the front-rear direction, i.e., about a generally vertical axis, and the rotor 320 is rotated in the up-down direction, i.e., about a horizontal axis. The rotary shaft 210 and the rotor 320 may be connected through a connection link 230.

In other words, a first end of the connection link 230 is in contact with the edge of the rotor 320 and a second end thereof is connected to a side of the rotary shaft 210. Thus, when the rotor 320 is rotated in the up-down direction by operation of the driving motor 310, the actuating portion 321 moves the connection link 230, thereby rotating the rotary shaft 210 laterally. Accordingly, the panel 220 that is coupled to the rotary shaft 210 is moved to the opened or closed position, thereby opening or closing the open space S of the housing 100.

In detail, as shown in FIGS. 4 and 5, a coupling portion 211 protrudes from the rotary shaft 210 and a through-hole 212 that extends a predetermined distance is formed at the coupling portion 211. The first end of the connection link 230 is in contact with the rotor 320 and the second end is inserted in the through-hole 212. Thus, the connection link 230 moves linearly in accordance with the rotation position of the rotor 320, thereby rotating the rotary shaft 210 together with the coupling portion 211. In this example, the through-hole 212 is an open ended slot formed along the body of the coupling portion 211.

As described herein, the coupling portion 211 laterally protrudes from the rotary shaft 210, so when the coupling portion 211 is moved in the front-rear direction, the rotary shaft 210 is rotated. Further, the through-hole 212 extending a predetermined distance is formed at the coupling portion 211. The first end of the connection link 230 is in contact with the edge of the rotor 320 and the second end is inserted in the through-hole 212. Thus, when the connection link 230 is pushed and moved linearly by an actuating portion 321 due to the rotation of the rotor 320, the connection link 230 pushes the coupling portion 211 while sliding through the through-hole 212. Accordingly, the rotation position of the rotary shaft 210, rotating with the linear motion of the connection link 230, can be adjusted.

A pair of stoppers 231 that are spaced apart from each other may be formed at the second end of the connection link 230. The coupling portion 211 may be positioned between the stoppers 231. Accordingly, since the pair of stoppers 231 is formed at the second end of the connection link 230 and since the second end of the connection link 230 is inserted in the through-hole 212 formed at the coupling portion 211 of the rotary shaft 210 and is positioned between the stoppers 231, when the connection link 230 is linearly moved, the second end of the connection link 230 is stopped by the stoppers 231 without coming out of the through-hole 212. Thus, the coupling portion 211 can be rotated to a predetermined position.

The distance between the stoppers 231 is larger than the thickness of the coupling portion 211 to accommodate for when the connection link 230 is moved. Accordingly, the rotary shaft 210 can be rotated with the coupling portion 211 that is connected to the connection link 230.

An elastic supporting portion 213 is formed at the rotary shaft 210. The elastic member 400 is connected to the elastic supporting portion 213 that is in contact with the housing 100. Thus, the elastic member 400 is able to provide elasticity so that the rotary shaft 210 can be returned to the initial position.

The elastic supporting portion 213 may laterally extend from the rotary shaft 210.

The elastic member 400 may be a torsion spring that is fitted on the rotary shaft 210 with a first end thereof connected to or borne against the elastic supporting portion 213 and a second end supported in a contact state by the housing 100. Thus, when the rotary shaft 210 is rotated from the initial position, the rotary shaft 210 is returned to the initial position by an elastic return force.

According to an embodiment of the present disclosure, when the driving motor 310 is operated and the rotor 320 is rotated, as shown in FIG. 6, with the panel 220 at the closed position that is the initial position, as shown in FIG. 5, an actuating portion 321 of the rotor 320 pushes the connection link 230. Thus, the rotary shaft 210 is rotated and the elastic member 400 accumulates elasticity (i.e., stored potential energy) while being tensioned. In this process, when the connection link 230 is moved to the end of the actuating portion 321, the rotary shaft 210 is maximally rotated and the panel 220 is moved to open. When the rotor 320 is further rotated and the connection link 230 is separated from the actuating portion 321 in this state, as shown in FIG. 7, the rotary shaft 210 is rotated to the initial position by the elasticity (i.e., the stored potential energy or spring bias force) of the elastic member 400. Accordingly, the connection link 230 is moved back and the panel 220 is returned to the closed position.

A plurality of flap units 200 may be disposed in the open space S of the housing 100. The panels 220 of the flap units 200 may be formed in diamond shapes and arranged in the longitudinal direction of each of the rotary shafts 210. The panels 220 of the flap units 200 may be disposed to partially overlap the panels 220 of the other flap units 200.

In an embodiment of the flap unit 200 according to the present disclosure, the panels 220 may be formed in diamond shapes and may be arranged in the longitudinal direction of the rotary shaft 210.

In particular, the plurality of flap units 200 may be arranged laterally in the open space S of the housing 100. The panels 220 of each flap unit 200 of the plurality of flap units may be disposed up and down in a zigzag or offset manner to partially overlap each other. Accordingly, when the plurality of flap units 200 are moved to close the open space S, the panels 220 of the plurality of flap units 200 can close the open space S of the housing 100. Only half of the panels and related components are shown in FIGS. 1-3. Furthermore, when the plurality of flap units 200 are moved to open the open space S of the housing 100, the panels 220 can close the open space S by rotating about 90°. The shape and number of the panels 220 of the plurality of flap units 200 may be modified in various ways in accordance with the design of a grille.

The driving unit 300 includes a driving shaft 311 that is rotated by power provided from the driving motor 310. The driving unit 300 also includes a plurality of rotors 320 that is in contact with a plurality of flap units 200, respectively, and may be disposed on the driving shaft 311.

In an embodiment of the present disclosure, a plurality of flap units 200 is provided, and accordingly, a plurality of rotors 320 constituting the driving unit is provided. Accordingly, one driving shaft 311 extends from the driving motor 310 and a plurality of rotors 320 is coupled to the driving shaft 311. When the driving shaft 311 is rotated by the driving motor 310, the rotors 320 can thereby be simultaneously rotated.

Further, as shown in FIG. 8, a seat 110 in which the driving shaft 311 is seated may be formed at the housing 100. An open hole 111 may be formed at the seat 110 so that the rotor 320 can be inserted and rotated therein.

A seat 110 in which the driving shaft 311 is seated may be formed at the housing 100, as described herein. A plurality of seats 110 may be arranged in the longitudinal direction of the driving shaft 311. Accordingly, the driving shaft 311 is rotatably seated in the plurality of seats 110 without sagging. A rib structure for maintaining a firm coupling state with respect to the housing 100 may be applied to the plurality of seats 110.

Further, an open hole 111 may be formed at each of the plurality of seats 110 so that when the driving shaft 311 is seated in the plurality of seats 110, the rotors 320 can be rotated through the open holes 111.

Accordingly, the driving shaft 311 can stably rotate with the rotors 320 without sagging when it is seated in the plurality of seats 110.

The rotors 320 of each driving unit 300 may be disposed such that the actuating portions 321 are sequentially arranged in a zigzag manner in the longitudinal direction of the driving shaft 311.

As shown in FIGS. 9 and 10, the actuating portions 321 of the rotors 320 are formed in a zigzag manner in the arrangement direction of the rotors 320. Thus, when the rotors 320 are rotated, the connection links 230 connected to the rotors 320, respectively, are linearly moved at different timings, such that the flap units 200 can be sequentially opened or closed.

Further, the rotors 320 may be grouped with the actuating portions 321 disposed at different positions so that the opening and closing timings of the flap units 200 are adjusted in accordance with the groups.

Since the opening and closing timings of the flap units 200 are different in accordance with the groups, as described herein, the opening and closing timings of the flap units 200 are different in respective sections. Accordingly, it is possible to enhance the opening and closing of the flap units 200 and provide various types of operation.

As for the rotor 320, a plurality of actuating portions 321 that are spaced apart from each other may be formed on and around the circumference of a base 322 rotating about a rotation center. The actuating portions 321 may be configured to be maintained within a predetermined diameter range R from the rotation center.

As shown in FIG. 11, the rotor 320 includes a base 322 or body and a plurality of differently shaped actuating portions 321 shown relative to a circular reference. The plurality of actuating portions 321 are spaced apart from each other on the edge of the base 322. In other words, the based 322 may be said to be circular and include the actuating portions 321 extending radially from the circular base 322. Accordingly, there is a difference between the smaller diameter of the circular base 322 of the rotor 320 and the larger diameters corresponding to the actuating portions 321. Thus, the flap unit 200 does not rotate when coming in contact with the base 322 due to the rotation of the rotor 320 but instead can rotate when coming in contact with the actuating portions 321.

In particular, the actuating portions 321 are configured to be maintained in a diameter range R preset from the rotation center of the base 322, so the rotation position of the flap unit 200 is changed within a predetermined rotation range. For example, a closed state is made when the flap unit 200 is at 0° and an open state is made when the flap unit 200 is at 90° in the present disclosure. Thus, the preset diameter range R may be set such that the flap unit 200 is rotated only 90° when coming in contact with the ends of the actuating portions 321.

Accordingly, the open and closed positions of the flap unit 200 can be adjusted in accordance with the positions where the flap unit 200 comes in contact with the smaller diameter base 322 or the protruding actuating portions 321.

Opening and closing of the flap unit 200 is diversified in the present disclosure.

According to an embodiment of the present disclosure, as can be seen in FIG. 11, the rotor 320 may have a first actuating portion 321a, a second actuating portion 321b, and a third actuating portion 321c. The actuating portions 321a, 321b, and 321c are spaced apart from each other around the circumference of the rotor 320 on the edge of the base 322 and are differently formed in accordance with the opening/closing function of the flap unit 200.

Since the first actuating portion 321a, the second actuating portion 321b, and the third actuating portion 321c are spaced apart from each other on the edge of the base 322 of the rotor 320, the opening/closing function of the flap unit 200 can be diversified into three stages in accordance with the rotation positions of the rotor 320. All of the first actuating portion 321a, the second actuating portion 321b, and the third actuating portion 321c may have different shapes. Additionally, the flap unit 200 can be opened and closed in accordance with the contacted actuating portions 321 in accordance with the rotation positions of the rotor 320.

In detail, the first actuating portion 321a may have a first contact surface A1 extending in the direction of a normal or tangent of the base 322 and a second contact surface A2 extending toward the rotation center with a reference line that crosses the rotation center. The second contact surface A2 may thereby be able to have a steep variation section.

In other words, when the rotor 320 is rotated with the flap unit 200 in contact with the rotor 320, the flap unit 200 is slowly opened because the first contact surface A1 extends in the direction of a normal or tangent of the base 322. Alternatively, the flap unit 200 is quickly closed by the elastic member 400 due to the steep variation of the second contact surface A2 that extends across the rotation center.

It is possible to achieve a desired quick transition function due to the dynamic operation of the flap unit 200 that is slowly opened and then quickly closed when coming in contact with the first actuating portion 321a.

The second actuating portion 321b has a first contact section B1 and a second contact section B2 symmetrically formed with respect to a virtual reference line crossing the rotation center of the base 322. The ends of the first contact section B1 and the second contact section B2 form a chamfered surface B3, so the second actuating portion 321b can have a gentle variation section.

In other words, the second actuating portion 321b has a gentle variation section because the chamfered surface B3 is formed at the joint of the first contact section B1 and the second contact section B2.

Accordingly, when the rotor 320 is rotated with the flap unit 200 in contact with the rotor 320, the flap unit 200 can be slowly opened along the first contact section B1. As the rotor 320 is further rotated, the flap unit 200 can be slowly closed along the second contact section B2. When the flap unit 200 is positioned on the chamfered surface B3 after passing along the first contact section B1, the open position is delayed, so the flap unit 200 can be smoothly operated. Accordingly, since the flap unit 200 is slowly opened and closed when coming in contact with the second actuating portion 321b, it is possible to enhance the operation while achieving the function of determining whether to allow air to pass through the open space S of the housing 100.

The third actuating portion 321c has a third contact section C1 and a fourth contact section C2 symmetrically formed with respect to a virtual reference line crossing the rotation center of the base 322. The ends of the third contact section C1 and the fourth contact section C2 meet each other at a rounded point, so the third actuating portion 321c can have a steep variation section.

In other words, the third actuating portion 321c has a steep variation section because the third contact section C1 and the fourth contact section C2 are connected in a pointed shape.

Accordingly, when the rotor 320 is rotated with the flap unit 200 in contact with the rotor 320, the flap unit 200 can be rapidly opened along the third contact section C1. As the rotor 320 is further rotated, the flap unit 200 can be rapidly closed along the fourth contact section C2. In other words, the opening and closing motions of the flap unit 200 can be quickly changed because the transition point of the third contact section C1 and the fourth contact section C2 is relatively pointed. It is possible to give a message in cooperation with turn signals or emergency lamps due to the quick variation of the opening and closing motions of the flap unit 200 on the third actuating portion 321*c*. To this end, the driving motor 310 can repeatedly rotate the rotor 320 forward and backward so that the flap unit 200 repeatedly comes in contact with the third contact section C1 and the fourth contact section C2 of the third actuating portion 321*c*.

As described above, the rotor 320 of the present disclosure may have the first actuating portion 321*a*, the second actuating portion 321*b*, and the third actuating portion 321*c*. It is possible to diversify the opening and closing motions of the flap unit 200 by changing the set angles or the shapes of the actuating portions 321*a*, 321*b*, and 321*c*.

The driving unit 300 is positioned at the uppermost end or the lowermost end of the flap unit 200 to prevent the driving unit 300 from being interfered with by the flow of air flowing through the open space S of the housing 100. In the present disclosure, the driving unit 300 is installed at the upper end of the housing 100, so the uppermost end of the flap unit 200 is connected to the driving unit 300. Accordingly, when the flap unit 200 opens the open space S of the housing 100, air can flow through the open space S.

The variable grille apparatus having the structure described above adjusts the flow rate of air passing through the grille. Additionally, the opening and closing motions for adjusting the flow rate of air is enhanced, thereby improving the commercial value of a vehicle equipped with the disclosed apparatus.

Further, since the grille is opened and closed in various ways such as by sequential or simultaneous opening and closing, the opening and closing motions of the grille are enhanced, the external design is diversified, and a flow rate of air is secured through the structurally optimal arrangement.

Although the present disclosure was provided above in relation to specific embodiments shown in the drawings, it should be apparent to those having ordinary skill in the art that the embodiments of the present disclosure may be changed and modified in various ways without departing from the scope of the present disclosure described in the following claims.

What is claimed is:

1. A variable grille apparatus comprising:
a housing having an open space that is open in a front-rear direction;
a flap unit rotatably installed on the housing and config-ured to open and close the open space depending on a rotation position;
a driving unit including a driving motor and a rotor configured to be rotated by a rotational power of the driving motor, the rotor being in contact with the flap unit, wherein the rotor has a plurality of actuating portions formed on an edge of the rotor, the plurality of actuating portions being in contact with the flap unit, each of the actuating portions being formed in different shapes such that the flap unit is differently rotated depending on the different shapes of the actuating portions when the rotor is rotated; and an elastic member connected to the flap unit to return the flap unit to an initial position.

2. The variable grille apparatus of claim 1, wherein the flap unit includes a rotary shaft rotatably installed on the housing and a panel coupled to the rotary shaft to rotate with the rotary shaft.

3. The variable grille apparatus of claim 2, wherein
the rotary shaft and the rotor are disposed in a zigzag pattern in the front-rear direction,
the rotary shaft is rotated in the front-rear direction and the rotor is rotated in an up-down direction, and
the rotary shaft and the rotor are connected through a connection link.

4. The variable grille apparatus of claim 2, wherein
the rotary shaft and the rotor are connected through a connection link,
a coupling portion protrudes from the rotary shaft and a through-hole extending a predetermined distance is formed at the coupling portion, and
a first end of the connection link is in contact with the rotor and a second end of the connection link is inserted in the through-hole, so the connection link linearly moves in accordance with a rotation position of the rotor, thereby rotating the rotary shaft together with the coupling portion.

5. The variable grille apparatus of claim 4, wherein a pair of stoppers spaced apart from each other is formed at the second end of the connection link and wherein the coupling portion is positioned between the stoppers.

6. The variable grille apparatus of claim 2, wherein an elastic supporting portion is formed at the rotary shaft and wherein the elastic member is connected to the elastic supporting portion and is in contact with the housing, thereby providing elasticity so that the rotary shaft can be returned to an initial position.

7. The variable grille apparatus of claim 2, wherein
a plurality of flap units is provided in the open space of the housing, and
panels of the plurality flap units are formed in diamond shapes and arranged in a longitudinal direction of the rotary shaft.

8. The variable grille apparatus of claim 1, wherein
a plurality of flap units is provided in the open space of the housing, and
the driving unit includes a driving shaft configured to be rotated by power from the driving motor and a plurality of rotors in contact with a plurality of flap units, respectively, disposed on the driving shaft.

9. The variable grille apparatus of claim 8, wherein a seat in which the driving shaft is seated is formed at the housing and wherein an open hole is formed at the seat so that the rotor can be inserted and rotated therein.

10. The variable grille apparatus of claim 8, wherein the rotors of the driving unit are disposed such that the actuating portions are sequentially arranged in a zigzag or offset manner in a longitudinal direction of the driving shaft.

11. The variable grille apparatus of claim 1, wherein the rotor has a plurality of actuating portions spaced apart from each other and formed on a base of the rotor rotating about a rotation center, and wherein the actuating portions are formed to be maintained in a diameter range preset from the rotation center.

12. The variable grille apparatus of claim 1, wherein the rotor has a first actuating portion, a second actuating portion, and a third actuating portion that are spaced apart from each other on an edge of a base of the rotor and are shaped differently in accordance with an opening and closing function of the flap unit.

13. The variable grille apparatus of claim 12, wherein the first actuating portion has a first contact surface extending in a direction tangent to the base and a second contact surface extending toward a rotation center, thereby having a steep variation section.

14. The variable grille apparatus of claim 12, wherein the second actuating portion has a first contact section and a second contact section symmetrically formed with respect to a reference line crossing a rotation center of the base, and wherein ends of the first contact section and the second contact section meet and form a chamfered surface defining a gentle variation section of the second actuating portion.

15. The variable grille apparatus of claim 12, wherein the third actuating portion has a third contact section and a fourth contact section symmetrically formed with respect to a reference line crossing a rotation center of the base, and wherein ends of the third contact section and the fourth contact section meet each other to form a pointed end, so the third actuating portion has a steep variation section.

16. The variable grille apparatus of claim 1, wherein the driving unit is positioned at an uppermost end or a lowermost end of the flap unit.

\* \* \* \* \*